UNITED STATES PATENT OFFICE.

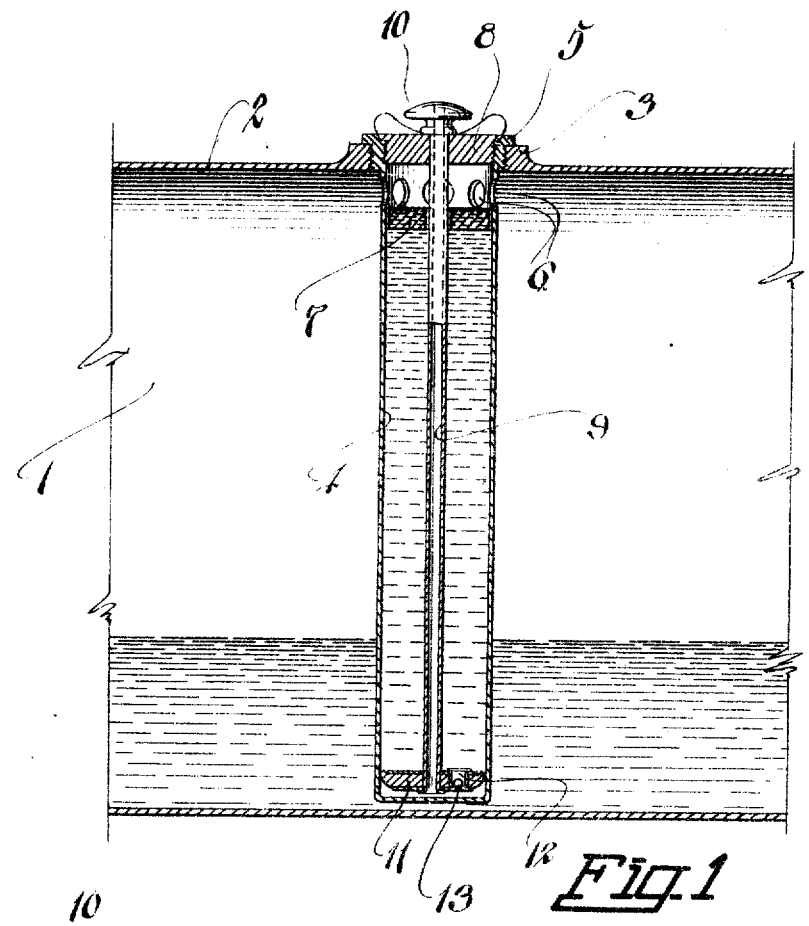

AMBROSE W. CODD, OF SPOKANE, WASHINGTON.

RESERVE SUPPLY-TANK.

1,374,433.             Specification of Letters Patent.    Patented Apr. 12, 1921.

Application filed March 24, 1920. Serial No. 368,276.

*To all whom it may concern:*

Be it known that I, AMBROSE W. CODD, a citizen of the United States, residing at Spokane, in the county of Spokane and State of Washington, have invented certain new and useful Improvements in Reserve Supply-Tanks, of which the following is a specification.

The present invention relates to improvements in reserve supply tanks for liquid fuel in connection with the internal combustion engines of automobiles, motor trucks and similar vehicles.

By the utilization of the subject matter of my invention I provide an auxiliary tank within the main fuel supply tank which is readily accessible from the exterior of both tanks, whereby when the supply in the main tank is exhausted the contents of the reserve tank may be emptied into the main tank and withdrawn from the main tank in usual manner.

By the special combination and arrangement of parts of my invention the reserve supply tank is necessarily filled by the operator before the main tank is filled, thus insuring a reliable reserve supply in the main tank for emergency use. While the liquid fuel is being consumed from the main tank, it will be understood that the supply in the auxiliary or reserve tank is maintained and isolated apart from the main supply and the consumption of the main supply does not affect the reserve supply.

With these ends in view the invention consists in certain novel combinations and arrangements of parts whereby the main supply tank is filled through, and subsequent to, the filling of the reserve supply tank, and whereby the fuel in the empty main tank may be replenished by novel means for emptying the reserve tank of its contents into the main tank, all as will be hereinafter described.

In the accompanying drawings I have illustrated one complete example of the physical embodiment of my invention in which the parts are combined and arranged according to the best mode I have so far devised for the practical application of the principles of my invention.

Figure 1 is a vertical sectional view through a portion of a main fuel supply tank, illustrating therein the reserve supply tank forming the subject matter of the present invention.

Fig. 2 is a detail sectional view of a portion of the reserve supply tank showing the parts in the position they occupy when the tanks are being filled.

Fig. 3 is a top plan view of reserve supply tank closure.

In the preferred form of the invention as illustrated in the drawings I have shown a sufficient portion of the main tank 1 of an automobile or motor truck in which is carried the main fuel supply or gasolene for utilization with the motor or internal combustion engine thereof, and in the top wall of this metallic tank is formed a thickened or enlarged portion 3 forming an interiorly threaded boss for the reception and retention of the auxiliary or reserve supply tank 4. The reserve tank is preferably in the form of a cylinder, closed at the bottom and fashioned at its open top with thickened walls to provide a bushing 5 having both interior and exterior threads, the latter to screw into the opening of the boss in the tank top.

The reserve supply tank is disposed in the main tank as indicated in Fig. 1, reaching substantially from the top of the main tank to the bottom thereof, and supported in the top opening in the main tank which is substituted for the usual filling opening of the main tank.

Near the top of the reserve supply tank is arranged a series of ports or overflow openings 6, situated just beneath the top of the main tank, and below the series of ports a cork or buoyant float 7 is supported on the surface of the gasolene in the reserve tank, to prevent splash and exit of the gasolene from the reserve tank through the ports to the main tank. A solid metal screw cap or plug 8 is used to close the upper open end of the reserve tank, making a tight joint or fit in the tank, which is of course removed, as in Fig. 2, when the tanks are to be filled.

For the purpose of emptying the contents of the reserve tank into the main tank, when necessary, I employ a lift rod or bar 9, preferably tubular and open for venting the tank and supported in the screw cap. The cap or plug is centrally perforated to permit guided vertical movement of the lift rod, which may be elevated by grasping the outside knob 10 on its upper end and the rod or bar pulled upwardly through the perforated cap. At its lower end the lift rod is equipped with a circular, flat head 11 of suitable construction and fixed rigidly on the bar, and of the required diameter to fit snugly in the reserve cylinder and permit movement therein. Thus the rod and its head are adapted to function as a lift pump to lift the column of gasolene in the reserve cylinder and pass it through the overflow ports of the cylinder into the main tank, the flow of gasolene passing through the ports beneath the float 7 which is elevated by the pressure of gasolene from below. Thus as the stem or rod is lifted the contents are transferred from the reserve cylinder to the main tank, and should any of the liquid escape around the edge of the upwardly moving head and fall to the bottom of the cylinder, a reverse stroke of the lift rod and a second lifting of the head will lift the remaining liquid which passes through the valve opening 12 on the downstroke, and is prevented from passing through the valve seat by the ball valve 13, on the upstroke or lifting stroke of the lift rod and its head.

For the purpose of filling the tanks, the cap or plug is removed, and the lift head elevated as in Fig. 2, permitting the gasolene to flow into and first fill the reserve tank and then overflow through the ports 6 and fill the main tank. When the main supply is exhausted, the reserve supply is poured into the main tank by a gradual lifting of the column of gasolene as before described.

What I claim as new and desire to secure by Letters Patent is—

1. The combination with a main fuel supply tank having a threaded opening in its top wall, of an open end reserve supply tank secured in the opening and provided with upper overflow ports, a perforated cap secured in the open end of the reserve tank, a hollow lift stem supported in the cap and a valved lift head on the lower end of the stem, normally located at the bottom of the reserve tank.

2. The combination with a main fuel supply tank having a threaded opening in its top wall, of an open end reserve supply tank consisting of a cylindrical receptacle formed with a head-boss adapted to screw into said threaded opening, a perforated cap screwed into the interior of said head-boss, a hollow lift rod having a knob outside the tank and movable in said perforated cap, a round lift head fixed at the lower end of the rod, a valve port through said lift head and a ball valve for said port, a perforated float supported on the column of liquid in the cylinder, and said cylinder having overflow ports whereby, when the lift head is elevated the contents of the cylinder is transferred to the tank for the purpose described.

In testimony whereof I affix my signature.

AMBROSE W. CODD.